United States Patent
Kaitha

(10) Patent No.: US 11,960,364 B2
(45) Date of Patent: Apr. 16, 2024

(54) EVENT PROCESSING

(71) Applicant: Capital One Services, LLC, McLean, VA (US)

(72) Inventor: Sunil Kaitha, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/822,865

(22) Filed: Aug. 29, 2022

(65) Prior Publication Data

US 2022/0413969 A1  Dec. 29, 2022

Related U.S. Application Data

(63) Continuation of application No. 16/848,179, filed on Apr. 14, 2020, now Pat. No. 11,461,185.

(51) Int. Cl.
| | |
|---|---|
| *G06F 16/00* | (2019.01) |
| *G06F 11/14* | (2006.01) |
| *G06F 16/27* | (2019.01) |
| *G06N 20/00* | (2019.01) |

(52) U.S. Cl.
CPC .......... *G06F 11/1464* (2013.01); *G06F 16/27* (2019.01); *G06N 20/00* (2019.01); *G06F 2201/86* (2013.01)

(58) Field of Classification Search
None
See application file for complete search history.

(56) References Cited

U.S. PATENT DOCUMENTS

| | | | |
|---|---|---|---|
| 7,634,679 B2 * | 12/2009 | Quintiliano | G06F 11/2028 714/4.11 |
| 7,661,099 B2 | 2/2010 | Farchi et al. | |
| 8,904,231 B2 * | 12/2014 | Coatney | G06F 11/2023 714/4.11 |
| 9,891,966 B2 | 2/2018 | Doyle et al. | |
| 10,085,131 B2 | 9/2018 | Barnum et al. | |
| 10,108,634 B1 | 10/2018 | Pal | |
| 10,180,980 B2 | 1/2019 | Khan et al. | |
| 11,099,956 B1 * | 8/2021 | Polimera | G06F 9/45558 |
| 2004/0133793 A1 | 7/2004 | Ginter et al. | |
| 2011/0041006 A1 | 2/2011 | Fowler | |
| 2012/0303999 A1 * | 11/2012 | Calder | G06F 11/1471 714/E11.09 |
| 2014/0330767 A1 | 11/2014 | Fowler | |
| 2015/0378830 A1 | 12/2015 | Hoobler, III et al. | |
| 2019/0266276 A1 * | 8/2019 | Patel | G06F 16/2365 |

\* cited by examiner

*Primary Examiner* — Bai D Vu
(74) *Attorney, Agent, or Firm* — Banner & Witcoff, Ltd.

(57) ABSTRACT

An event processing system may identify duplicate events and prevent one or more of the duplicate events from being processed. The event processing system may determine the duplicate events, which are not permitted to be processed more than once, and allow these duplicate events to be processed exactly once. The event processing system may allow events, which are permitted to be processed more than once, to be processed without determining whether the events are duplicate events. If a main data center of the event processing system fails, a backup data center may take over instantly event processing from the main data center and may prevent events that have been processed by the main data center from being processed. Multiple data centers may work together and process events in an active-active mode by offering the exactly once processing as well as removing any duplicate events from upstream systems.

20 Claims, 6 Drawing Sheets

EVENT PROCESSING

CROSS REFERENCE TO RELATED APPLICATIONS

This application is a continuation of U.S. application Ser. No. 16/848,179, filed Apr. 14, 2020, the entire contents of which are incorporated herein by reference.

FIELD OF USE

Aspects of the disclosure relate generally to event processing. More specifically, aspects of the disclosure may provide for preventing one or more events from being processed more than once.

BACKGROUND

The event processing system may send an event, generated by an event source, to a consumer. A failure in the event processing system may cause duplication of an event that has been previously processed (e.g., that has been previously sent to the consumer). Also, during a failover (e.g., switching from a main data center of the event processing system to a backup data center of the event processing system), the backup data center may lose track of processed events that have been processed by the main data center. Sometimes, processing duplicate events (e.g., sending the duplicate events to the consumers) may deteriorate a user's experience, negatively impact event processing efficiency, and waste event processing resources. For example, if a pay-bill event is sent to a bank server (e.g., the consumer) twice, the bank server may charge a user's bank account twice for the same bill. The user may complain about the double charge and may even take legal action against the bank if such double charging happens too many times. Also, processing duplicate events may waste event processing resources. Aspects described herein may address these and other problems, and generally improve a user's experience, improve event processing efficiency, and save event processing resources.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may identify duplicate events and prevent one or more of the duplicate events from being processed. Alternatively or additionally, the event processing system may determine duplicate events, which are not permitted to be processed more than once (e.g., which negatively impact business and/or deteriorate a user's experience if processed more than once), and cause these duplicate events to be processed exactly once. Alternatively or additionally, the event processing system may allow events, which are permitted to be processed more than once, to be processed regardless of whether the events are duplicate events. The user's experience may be improved and the event processing resources may be efficiently utilized.

Further aspects described herein may allow the backup data center to replicate event data of the main data center. Events that have been processed by the main data center may be tracked. If a failover occurs (e.g., the backup data center taking over event processing from the main data center), the backup data center may recreate an event processing environment that was at the main data center. Based on the replicated event data and information about events that have been processed by the main data center, the backup data center may prevent events that have been processed by the main data center from being processed. The failover may take place seamlessly.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for preventing one or more events from being processed more than once. The event processing system may include an event tracking system. Based on event information and/or an event identifier of an event, the event tracking system may determine whether the event is permitted to be processed more than once and/or whether the event is a duplicate event. Alternatively or additionally, consumer partitions or offset information of an event may be used to determine if the event is a duplicate event. A duplicate event, which is not permitted to be processed more than once, may be blocked from being sent to the consumer (or downstream associated with the consumer). Events, which are permitted to be processed more than once, may be processed regardless of whether the events are duplicate events. As discussed further herein, this combination of features may improve a user's experience and improve efficiency of event processing.

Before discussing these concepts in greater detail, however, several examples of a computing device that may be used in implementing and/or otherwise providing various aspects of the disclosure will first be discussed with respect to FIG. 1.

Figure 1:
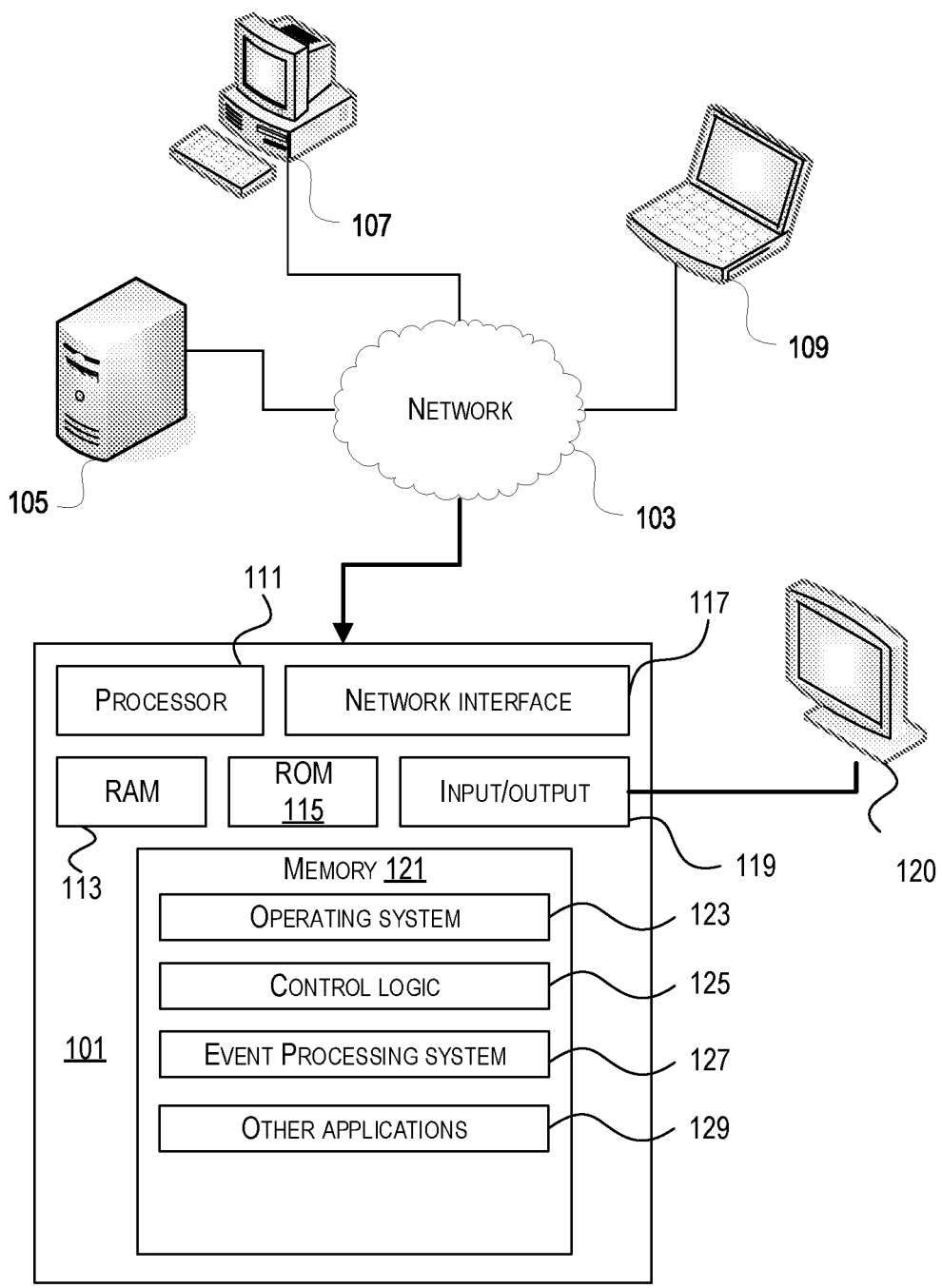
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, the computing device 101 may, in some embodiments, implement one or more aspects of the disclosure by reading and/or executing instructions and performing one or more actions based on the instructions. In some embodiments, the computing device 101 may represent, be incorporated in, and/or include various devices such as a desktop computer, a computer server, a mobile device (e.g., a laptop computer, a tablet computer, a smartphone, any other types of mobile computing devices, and the like), and/or any other type of data processing device.

The computing device 101 may, in some embodiments, operate in a standalone environment. In others, the computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. The network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, the computing device 101 may include a processor 111, a RAM 113, ROM 115, a network interface 117, input/output interfaces (I/O) 119 (e.g., keyboard, mouse, display, printer, etc.), and a memory 121. The processor 111 may include one or more computer processing units (CPUs), graphical processing units (GPUs), and/or other processing units such as a processor adapted to perform computations associated with machine learning. The I/O 119 may include a variety of interface units and drives for reading, writing, displaying, and/or printing data or files. The I/O 119 may be coupled with a display such as a display 120. The memory 121 may store software for configuring the computing device 101 into a special purpose computing device in order to perform one or more of the various functions discussed herein. The memory 121 may store an operating system software 123 for controlling overall operation of the computing device 101, a control logic 125 for instructing the computing device 101 to perform aspects discussed herein, an event processing system software 127, and other applications 129. Methods of event processing may be implemented in suitable program instructions, such as in the event processing system software 127. The control logic 125 may be incorporated in and may be a part of the event processing system software 127. In other embodiments, the computing device 101 may include two or more of any and/or all of these components (e.g., two or more processors, two or more memories, etc.) and/or other components and/or subsystems not illustrated here.

Devices 105, 107, 109 may have similar or different architecture as described with respect to the computing device 101. Those of skill in the art will appreciate that the functionality of the computing device 101 (or the device 105, 107, 109) as described herein may be spread across multiple data processing devices, for example, to distribute processing load across multiple computers, to segregate transactions based on geographic location, user access level, quality of service (QoS), etc. For example, the devices 101, 105, 107, 109, and others may operate in concert to provide parallel computing features in support of the operation of the control logic 125 and/or the event processing system software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

As mentioned previously, processing duplicate events may negatively impact a user's experience and negatively impact event processing efficiency. To solve these problems, the event processing system may identify duplicate events and prevent one or more of the duplicate events from being processed. These features will be further described with reference to FIGS. 2-6.

Figure 2:
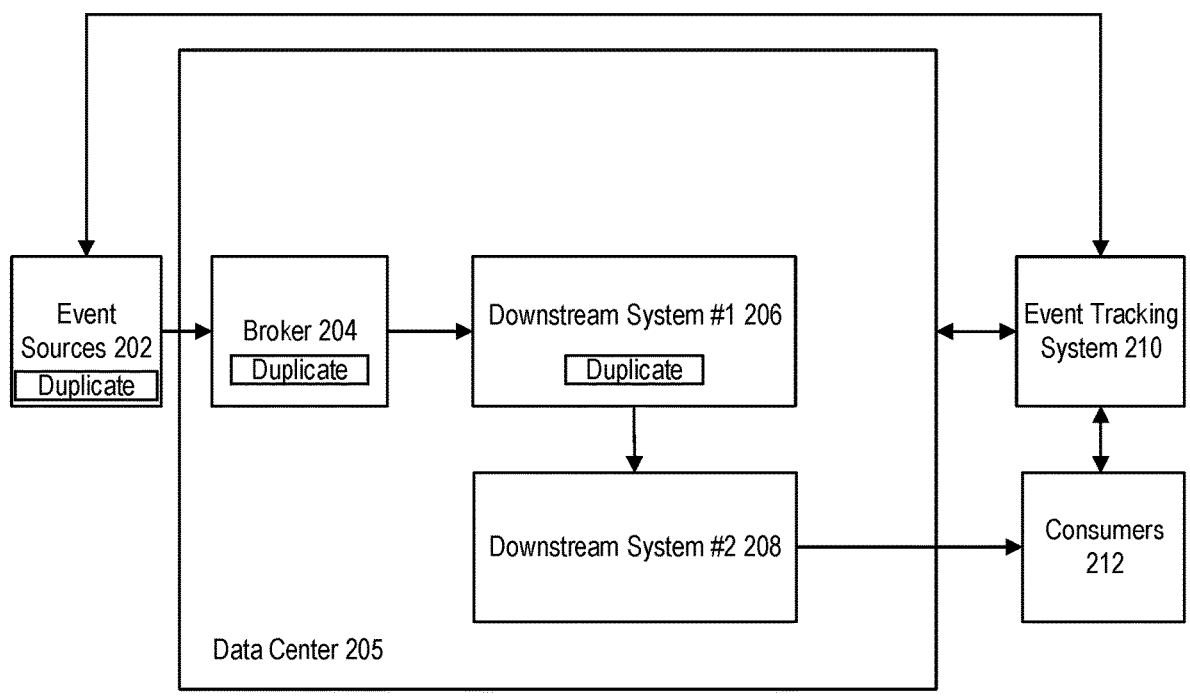
FIG. 2 depicts an example event processing system according to one or more aspects of the disclosure.

FIG. 2 depicts an example event processing system 200 according to one or more aspects of the disclosure. In the event processing system 200, one or more event sources 202 may generate and send events to one or more consumers 212. Each of the event sources 202 may be any one of the computing devices 101, 105, 107, and 109 of FIG. 1, or one or more applications running on any one of the computing devices 101, 105, 107, and 109. Each of the consumers 212 may be any one of the computing devices 101, 105, 107, and 109, or one or more applications running on any one of the computing devices 101, 105, 107, and 109.

An event may be a message or a message indicating an action. For example, an event may be, e.g., a billing statement, an instruction to charge a bank account, an instruction to make a payment, an instruction to withdraw cash, a promotional advertisement, an instruction to trade a stock, an update of account information, or any other message/instruction that may be exchanged between any two of the computing devices 101, 105, 107, and 109. Event information may comprise any information about the event. For example, the event information may comprise an event title indicating a general purpose of the event (e.g., a pay-bill event title indicating an instruction to make a payment with a bank account, a cash-withdrawal event title indicating an instruction to withdraw cash from a bank account), a date associated with the event (e.g., a date of the bill statement), a source address (e.g., an Internet Protocol (IP) address or a MAC address of the event source), a destination address (e.g., an IP address or a MAC address of a target consumer), an amount associated with the event (e.g., an amount of a bill statement, a payment amount of a pay-bill event), a time when the event was generated, a user name associated with the event, and/or any other information associated with the event. In some cases, an event may be assigned with an event identifier (e.g., a unique series of digits, a unique series of letters, a unique series of symbols, a unique series of combination of digits/letters/symbols).

In some cases, one event may trigger another event. For example, initially, a user's smartphone (initially functioning an event source) may send a pay-bill event to a bank server (initially functioning a consumer) to instruct the bank server to make a payment with the user's bank account. After the bank server receives the pay-bill event, the bank server may charge or cause the user's bank account to be charged for an amount indicated in the pay-bill event. The bank server may then switch to function as an event source to generate a confirmation event (e.g., a payment confirmation email confirming that the payment has been successfully made), and send the confirmation event to the user's smartphone (switching to function as a consumer).

A data center 205 may be disposed between the event sources 202 and the consumers 212, and may manage and process the events. The data center 205 may include a broker 204, a downstream system #1 206, a downstream system #2 208, etc. The broker 204 may be any one of computing devices 101, 105, 107, and 109. The broker 204 may manage the events received from the event sources 202. For example, the broker 204 may put the events, generated by the event sources 202, in an event queue in a first-in-first-out manner. As another example, the broker 204 may put the events in one or more consumer partitions and assign each event with an offset value in a corresponding consumer partition (which will be discussed with respect to FIG. 3). The functionality of the broker 204 is not limited to the actions described above, but may include any other action required during the event processing, for example, translating a messaging protocol of the event source to a messaging protocol of the consumer.

A failure may occur in the event processing system 200, and duplication of processed events may occur due to such a failure. An event tracking system 210 may identify duplicate events (e.g., comparing an event identifier of an event with event identifiers of processed events, identifying duplicate events by a machine learning method, which will be described later), and control the downstream system #1 206 to block or ignore one or more of the detected duplicate events (e.g., replacing the duplicate events with dummy data, removing the duplicate events from the event queue or the consumer partitions), and send the remaining events to the downstream system #2 208. The event tracking system 210 may include a duplicate decision engine (not shown), and the duplicate decision engine may identify duplicate events and may further determine if the duplicate events need to be blocked from being processed or may be processed (which will be described later). The downstream system #2 208 may then send the remaining events to the consumers 212. Each of the downstream system #1 206 and the downstream system #2 208 may be any one of computing devices 101, 105, 107, and 109. The broker 204, the downstream system #1 206, and the downstream system #2 208 may be separate components or may be integrated together. The event tracking system 210 may be a separate component, or may be integrated with any component (e.g., the data center 205) in the event processing system 200, or may be distributed across the event processing system 200. The event tracking system 210 may take over one or more actions from the data center 205, and vice versa. The event identifiers, event information, consumer partitions and/or offset information, and/or any other data associated with the events may be stored in one or more databases.

For example, a user (e.g., a bank customer) may click a "Pay Bill" button on a bank application running on a smartphone (e.g., the event source 202). After the click, a pay-bill event may be generated and the target consumer may be a bank server (e.g., the consumer 212). The pay-bill event may be an instruction for the bank server to charge the user's bank account by a certain amount to pay a bill. The event information may include an event title indicating that event is a pay-bill event, the amount to be charged, an account number of the user's bank account, the IP address of the smartphone, the IP address of the bank server, the consumer's name, the time when the pay-bill event was generated, etc. The event may be processed and may be sent to the bank server. A failure may occur, and duplication of the processed pay-bill event may occur due to such a failure. For example, if the event source 202 fails (e.g., the smartphone reboots, the bank application running on the smartphone fails), the event source 202 may lose track of the processed pay-bill event, for example, incorrectly determining that the application had not responded to the "Pay Bill" button and that a pay-bill event had not been generated. The event source 202 may then generate a duplicate pay-bill event. In another example, the broker 204 or the downstream system #1 206 may malfunction and duplicate the original pay-bill event, and add the duplicate pay-bill event into the event queue or the consumer partitions.

The event tracking system 210 may determine, based on the event identifier, whether an event is a duplicate event. For example, the event tracking system 210 may record event identifiers of the processed events, and compare the event identifier of an event with the recorded event identifiers of the processed events to determine whether the event is a duplicate event. For example, the event tracking system 210 may determine that events at the downstream system #2 208 are eventually to be received by the consumers 212, and thus are processed events. The event identifiers of the processed event may be recorded. For example, the event tracking system 210 may enter the event identifiers of the processed events in a table. The event identifiers of the processed events may be stored in one or more databases. The event tracking system 210 may retrieve the event identifier of an event in an event queue, and compare the event identifier of the event to the event identifiers of all the processed events stored in the table. If a match is determined, the event may be determined to be a duplicate event. Otherwise, the event need not be determined to be a duplicate event.

Alternatively or additionally, the event tracking system 210 may determine a duplicate event based on event information (e.g., by comparing event information of an event in the event queue to event information of the processed events). For example, the event tracking system 210 may record event information of the processed events, and store the event information of the processed events in one or more databases. The event title of the event may be compared to the recorded event titles of the information of the processed events. If it is determined that the event title of the incoming event matches event title(s) of 100 processed events, the event tracking system 210 may continue to compare other event information (e.g. a time when an event is generated) of the event to that of the 100 processed events. The event tracking system 210 may keep performing the comparison of the event information until a complete match is found (e.g., all the event information of the event match to all the event information of at least one processed event) or until a complete match cannot be found. If a complete match is determined, the event may be determined a duplicate event. Otherwise, the event may be determined not a duplicate event.

Alternatively or additionally, the machine learning method may be used to identify a duplicate event. With the machine learning method, the event tracking system 210 may determine a duplicate event without seeking a complete match, thereby saving event processing resources. For example, after being trained for a certain time period, the event tracking system 210 may determine that if part of (not all of) the event information of an event matches the event information of at least one processed event, the event is determined to be a duplicate event. For example, after identifying 10,000,000 duplicate events in 30 days, the event tracking system 210 may determine that, for an event in the event queue, if the event title, at the time when the event is generated, and the user name associated with the event match the event information of at least one processed event, the possibility of the event being a duplicate event is 99.5%. Based on this, after the 30-day training period, the event tracking system 210 may only compare the event title, the time when the event is generated, and the user name to the event information of processed events, and determine the event to be a duplicate event if a match is found. As another example, if the event title, a payment amount, and a user name match the information of at least one processed event, the possibility of the event being a duplicate event is 99%. Similarly, the event tracking system 210 may identify a duplicate event by only comparing the event title, a payment amount, and a user name.

Alternatively or additionally, the event tracking system 210 may determine, based on event information, whether the incoming event is permitted to be processed more than once. Some events (e.g., a promotional advertisement) may be permitted to be processed more than once or may be eligible to ignore. For example, sending a promotional advertisement (e.g., an email including a promotion, an instant message including a promotion) to a potential customer multiple times may not likely negatively impact business and/or deteriorate a user's experience, and sometime may even help develop business (e.g., the potential customer may be attracted by a promotional email after reading the promotion multiple times, and may eventually become a customer). The event processing system 200 may allow these duplicate events to be processed and sent to the consumers. In some cases, the event tracking system 210 may use a reinforcement learning algorithm to choose an action on the event based on the event data itself, and may seek for continuous feedbacks and change strategies on subsequent events in real time based on the feedbacks. For example, if feedbacks from users indicate that sending a same promotional advertisement to a user multiple times would negatively impact business and/or deteriorate a user's experience, the reinforcement learning algorithm may change strategies on subsequent events and determine that, for subsequent events, duplicate promotional advertisements need to be ignored or blocked.

On the other hand, some events are not permitted to be processed more than once. For example, if the pay-bill event is sent to the bank server two times, the bank server may charge the user's bank account twice for a single bill. The user may complain about the double charges, and may even take legal actions against the bank if such double changes occur many times. As another example, even though processing some duplicate events (e.g., updating an account twice for a same change) needs not necessarily negatively impact business, such duplicate events may waste event processing resources and are also not permitted to be processed more than once. The event processing system 200 may prevent these duplicate events from being processed. The events that are not permitted to be processed more than once may comprise a billing statement, an instruction to charge a bank account, an instruction to make a payment, an instruction to withdraw cash, an instruction to trade a stock, an update of account information, and any other events that, if processed more than once, may negatively impact business and/or deteriorate a user's experience and/or waste event processing resources.

Based on event titles, the event tracking system 210 may categorize events into an event type that is not permitted to be processed more than once and an event type that is permitted to be processed more than once. For example, event titles that are associated with the event type that is not permitted to be processed more than once and/or event titles that are associated with the event type that is permitted to be processed more than once may be pre-stored in one or more databases. The pre-stored event titles may be reference event information. The event tracking system 210 may compare the event title of an event to the pre-stored event titles corresponding different event types to determine whether the event is permitted to be processed more than once.

Alternatively or additionally, the event tracking system 210 may determine, based on the event identifier of an event, whether the event is permitted to be processed more than once. The event identifier may indicate whether the event is permitted to be processed more than once. For example, an event identifier may be 122605212-P, and the letter "P" may indicate that this event is permitted to be processed more than once.

Alternatively or additionally, an idempotent system (e.g., an idempotent system 440 in FIG. 4) may determine whether an event is permitted to be processed more than once based on one or more methods described above. If it is determined that an event is permitted to be processed more than once, the idempotent system may allow the event to be sent to the consumer 212 without determining whether the event is a duplicate event. The idempotent system may be a separate component or may be integrated with the event tracking system 210 or any other component (e.g., the data center 205) in the event processing system. Alternatively or additionally, the idempotent system may be distributed in the event processing system.

The event tracking system 210 may detect duplicate events at any one of the event sources 202, broker 204, the downstream system #1 206, and/or determine that the duplicate events are not permitted to be processed more than once. The event tracking system 210 may block or ignore the duplicate events that are not permitted to be processed more than once, and prevent these duplicate events from being processed. For example, the event tracking system 210 may update the event queue or consumer partitions by replacing the duplicate events with dummy data (e.g., zeros). The consumers 212 need not take any action if they receive the dummy data. As another example, the event tracking system 210 may update the event queue or consumer partitions by removing these duplicate events from the event queue or consumer partitions (e.g., releasing the resources used to store these duplicate events for future use). The updated event queue or consumer partitions may be sent to the downstream system #2 208. The downstream system #2 208 may send the consumers 212 only those unprocessed events and/or the duplicate events that are permitted to be processed more than one time. The duplicate events, which are not permitted to be processed more than once, may be blocked and need not be processed.

In some cases, duplication of events may occur at the downstream system #2 208. Similarly, the event tracking system 210 may detect the duplicate events at the downstream system #2 208 and further prevent one or more of the duplicate events at the downstream system #2 208 from being sent to the consumers 212. In these cases, instead of determining that events at the downstream system #2 208 are processed events, the event tracking system 210 may determine that events that have been received by the consumers 212 are processed events.

The components in the event processing system 200 are not limited to the components described above or illustrated in FIG. 2, but may include any additional component that may be used in the event processing. For example, routers (not shown) may be used to pass the events to the target consumers.

Figure 3:
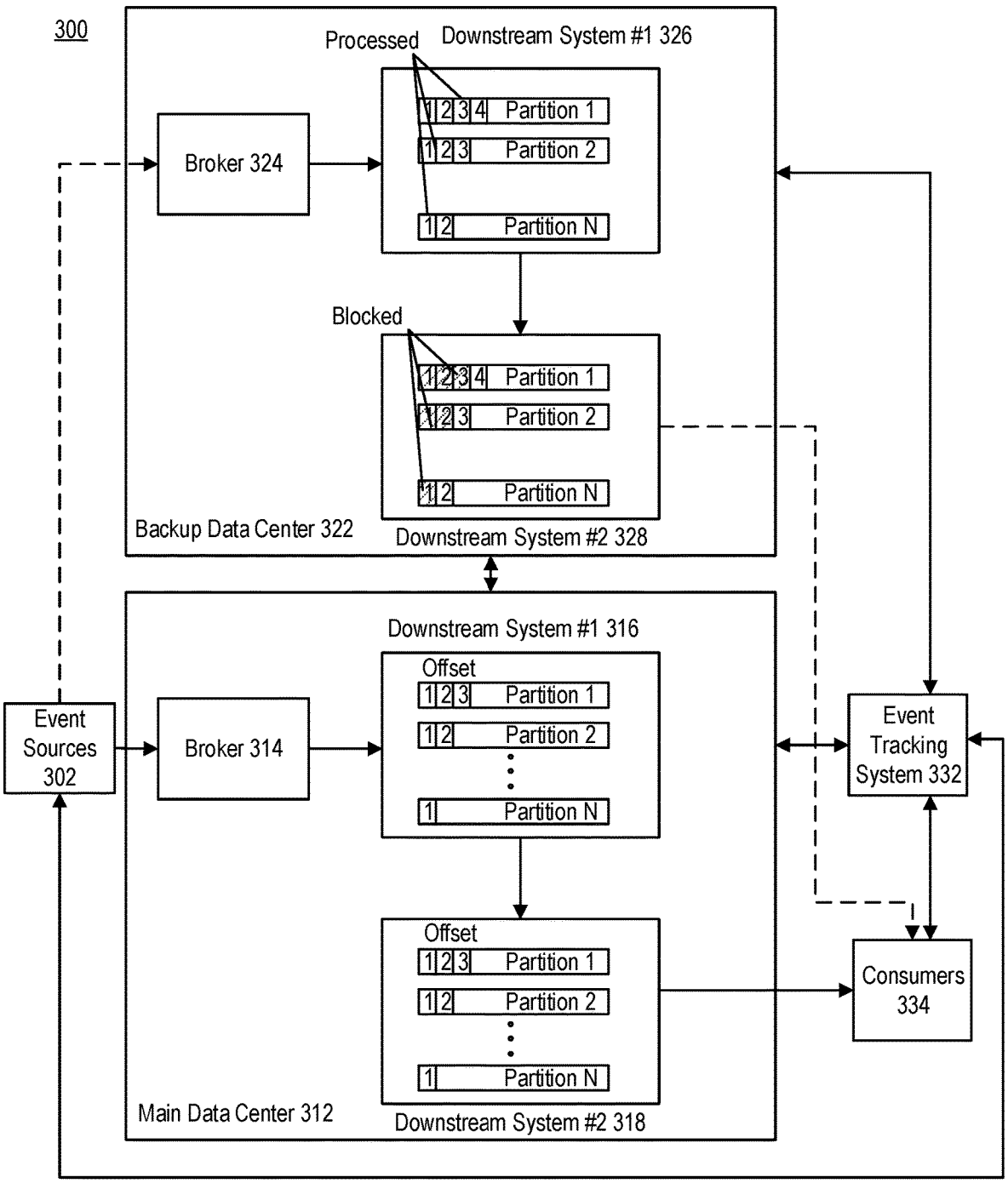
FIG. 3 depicts another example event processing system according to one or more aspects of the disclosure.

FIG. 3 depicts another example event processing system 300 according to one or more aspects of the disclosure. The event processing system 300 may include event sources 302, a main data center 312, a backup data center 322, an event tracking system 332, and consumers 334. The backup data center 322 may have similar processing functionality as the main data center 312. If the main data center 312 fails, the backup data center 322 may take over event processing from the main data center 312. The event tracking system 332 may be a separate component, or may be distributed across the data centers 312 and 322. The event tracking system 210 may take over one or more actions from the data center 205, and vice versa.

The main data center 312 may be a primary data center that is assigned to manage and process incoming events for a plurality of consumers 334. The backup data center 322 may be a secondary data center that, if the main data center 312 fails, takes over event processing from the main data center 312. The event tracking system 332 may track events that have been processed by the main data center 312. If a failover occurs, the processed events may be blocked or ignored, and need not be processed one more time by the backup data center 322. The event sources 302 may function similarly to the event sources 202, and may generate events. The consumers 334 may function similar to the consumers 212, and may receive the events and event take corresponding actions based on the received events.

The main data center 312 may function similar to the data center 205. For example, the main data center 312 may comprise a broker 314, a downstream system #1 316, and downstream system #2 318. Similar to the broker 204 managing the events received from the event sources 202, the broker 314 may manage the events received from the events sources 302. For example, the broker 314 may put the events, received from the event sources 302, into a plurality of consumer partitions, e.g., partition 1, partition 2, . . . , and partition N (N may be any number). A partition may include a storage or a memory region. Each partition may include an array of events that are to be consumed by a corresponding consumer 334. For example, the partition 1 may store events that have a destination address of a particular consumer 334, and the partition 2 may store events that have a destination address of another particular consumer 334, etc. In a partition, events may be arranged in a particular order and each of the events may assigned by a corresponding offset. An offset may correspond to a slot, in a partition, that may store an event. For example, events may be arranged in a time order based on times when the events are generated. An event that was generated earlier may be assigned with a smaller offset, and vice versa. For example, in the partition 1, the event generated at Feb. 7, 2020, 10:05:30 may be assigned with an offset of 2, the event generated at Feb. 7, 2020, 10:05:31 may be assigned with an offset of 3. New events received from the event sources 302 may append to the array with a bigger offset. As such, each event may be associated with a particular consumer partition and/or offset, and may be identified by such consumer partitions or offset information. For example, an event may be associated with consumer partitions or offset information of (P1, O2) indicating that the event is stored in the partition 1 at the offset of 2. Another event may be associated with consumer partitions or offset information of (P2, O1) indicating that the event is stored in the partition 2 at the offset of 1. Event identifiers, event information, consumer partitions and/or offset information, and/or any other data associated with the events may be stored in one or more databases.

If the main data center 312 operates normally, the event tracking system 332 may communicate with the main data center 312 and function similarly to the event tracking system 210. For example, the event tracking system 332 may detect duplicate events at the event sources 302 and the main data center 312, control the downstream system #1 316 to block or ignore one or more of the detected duplicate events, and send remaining events to the downstream system #2 318. In this example, the event tracking system 332 does not detect any duplicate event, and may allow the downstream system #1 316 to send all the events stored in the partitions 1-N to the downstream system #2 318.

The event tracking system 332 may monitor events that have been processed by the main data center 312, and record consumer partitions or offset information of the processed events, and store the information in one or more databases. For example, the event tracking system 332 may communicate with the consumers 334, and may determine that the events that have been received by the consumers 334 are the processed events. Alternatively or additionally, if the event tracking system 332 does not detect duplicate events at the downstream system #2 218, the event tracking system 332 may determine that the events at the downstream system #2 318 are eventually to be received by the consumers 334, and thus are processed events. In this example, the event tracking system 332 may record that events identified by consumer partitions or offset information of (P1, O1), (P1, O2), (P1, O3), (P2, O1), (P2, O2), . . . , (PN, O1) are the processed events.

If the main data center 312 operates normally, the backup data center 322 may communicate with the main data center 312, and replicate event data associated with the main data center 312. The backup data center 322 may include a broker 324 (similar to the broker 314), a downstream system #1 326 (similar to the downstream system #1 316), and a downstream system #2 328 (similar to the downstream system #1 318). The backup data center 322 may replicate the event data stored at one or more databases associated with the main data center 312, where the event data may comprise event identifiers, event information, consumer partitions and/or offset information, and/or any other data associated with the events. The backup data center 322 may store the replicated event data in one or more databases associated with the backup data center 322. As such, the backup data center 322 has the most recent information about the event processing at the main data center 312.

The main data center 312 may fail or stop operation. For example, a power outage may occur at the main data center 312, or the main data center 312 may be shut down for maintenance. If the main data center 312 fails or stops operation, a failover may occur. In this instance, the backup data center 322 may take over the event processing from the main data center 312. For example, the backup data center 322 may take the place of the main data center 312 and may connect to the event tracking system 332, the event sources 302, and the consumers 334. As the backup data center 322 has the event data associated with the main data center 312, the backup data center 322 may recreate the event processing environment that was at the main data center 312. For example, the backup data center 322 may recreate an event processing environment, which is the same as the event processing environment before the main data center 312 was shut down, where events identified by (P1, O1), (P1, O2), (P1, O3), (P2, O1), (P2, O2), . . . , (PN, O1) have been sent to the downstream system #1 326 and all these events have been forwarded to the downstream system #2 328. The backup data center 322 may start to receive new events from the event sources 302, and the broker 324 and/or the downstream system #1 326 may add these new events to corresponding consumer partitions. The new events may be events (P1, O4), (P2, O3), . . . , and (PN, O2).

As previously discussed, the event tracking system 332 has recorded that events identified by consumer partitions or offset information of (P1, O1), (P1, O2), (P1, O3), (P2, O1), (P2, O2), . . . , (PN, O1) have been processed by the main data center 312. The backup data center 322 may be informed of the consumer partitions or offset information of the processed events, and may determine that these processed events are duplicate events. The backup data center 322 need not process these duplicate events. In the backup data center 322, the downstream system #1 326 may update the consumer partitions by replacing these duplicate events with dummy data, or by removing the processed event from the consumer partitions. The downstream system #1 326 may send the updated consumer partitions to the downstream system #2 328 such that the only unprocessed events (e.g., events that have not been processed by the main data center 312) may be sent to the consumers 334. As such, the backup data center 322 may only process new, unprocessed events, thereby saving the event processing resources.

The components in the event processing system 300 are not limited to the components described above or illustrated in FIG. 3, but may include any additional component that may be used in the event processing. For example, the event processing system 300 may include a central controller (not shown) to determine, at initialization of the event processing system 300, that the main data center 312 is a main data center and the backup data center 322 is a potential backup data center for the main data center 312. The central controller may be a separate component or may be integrated to any other components in the event processing system 300. In some other cases, the central controller may be an external component that is remote from the event processing system 300.

Figure 4:
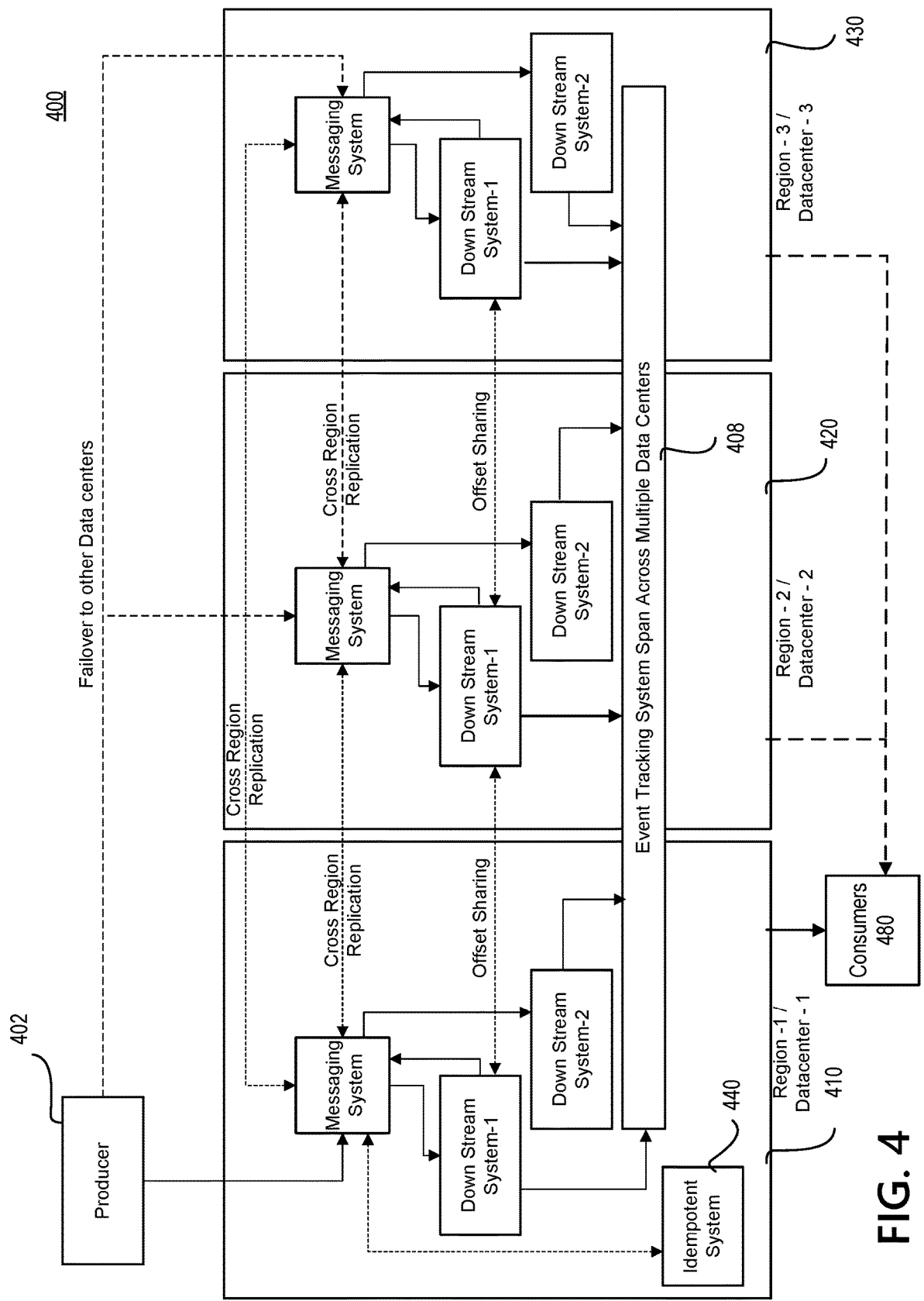
FIG. 4 depicts still another example event processing system according to one or more aspects of the disclosure.

FIG. 4 depicts an example event processing system 400 according to one or more aspects of the disclosure. The event processing system 400 may comprise a plurality of data centers (e.g., a data center 410, a data center 420, a data center 430, etc.). One or more of these data centers may be main data centers that process events for consumers located in corresponding geographical regions. If one of the data centers (e.g., the data center 410) fails, it may failover to one of the other data centers (e.g., the data center 420 or the data center 430).

For example, each of the data centers 410-430 may be a main data center servicing corresponding consumers. The data center 410 may process events for consumers 480 (similar to consumers 212) that are located in region 1. For example, the data center 410 may send events, which are generated by producers 402 (e.g., the event sources 202), to the consumers 480 located in region 1. Similarly, the data center 420 may process events for consumers (not shown) that are located in region 2, and the data center 430 may process events for consumers (not shown) that are located in region 3. Each of the data centers 410-430 may have similar functionality as the data center 205. For example, each data center may have a messaging system (similar to the broker 204), a downstream system 1 (similar to the downstream system #1 206), and a downstream system 2 (similar to the downstream system #2 208). In some cases, as discussed previously with respect to FIG. 2, an idempotent system 440 may allow incoming events, which are permitted to be processed more than once, to be sent to the consumers 212 without further determining whether the incoming events are duplicate events.

Each of the data centers 410-430 may be a potential backup data center for one or more of the other two data centers. For example, similar to the backup data center 322, each of the data centers 410-430 may replicate event data of one or more of the other two data centers. For example, the data center 410 may replicate event data of the data centers 420 and/or 430; the data center 420 may replicate event data of the data centers 410 and/or 430; and/or the data center 430 may replicate event data of the data centers 410 and/or 420.

An event tracking system 408 may communicate with the data centers 410-430, and may track event processing in these data centers. The event tracking system 408 may be a separate component or may be distributed across the data centers 410-430. The event tracking system 408 may function similar to the event tracking system 210 or the event tracking system 332. For example, for each of the data centers 410-430, the event tracking system 408 may detect duplicate events (e.g., based on the event identifiers), determine whether an event is permitted to be processed more than once (e.g., based on the event title), and/or control the downstream system 1 to block or ignore the duplicate events that are not permitted to be processed more than once. The event tracking system 408 may record information (e.g., the consumer partitions or offset information) associated with the processed events in each of the data centers 410-430.

If a data center (e.g., the data center 410) fails, it may failover to one of other data centers (e.g., the data center 420 or the data center 430). For example, as the data center 410 keeps replicating event data of the data center 420 and the data center 430, the data center 410 may be aware of event processing load at each of the data centers 420, 430. The data center 410 may continuously determine, at the current moment, which one of the data centers 420 and 430 may be able to process events for the consumers 480 in addition to the consumers that they are currently servicing. The data center 410 may choose to failover to the data center that has capability to process events for the consumers 480 in addition to the consumers that it services. If both of the data centers 420, 430 have the capability, the data center 410 may randomly choose one of the data centers 420, 430 to failover. For example, the data center 420 may be chosen as the backup data center. If a failover occurs, the data center 420 may take over event processing from the data center 410. The failover may be similar to the failover discussed with respect to FIG. 3. After the failover, the data center 420 may process events for the consumers in regions 1 and 2. Alternatively or additionally, the idempotent system 440 may be connected to the data center 420 and perform similar functionality as it did in the data center 410.

Figure 5:
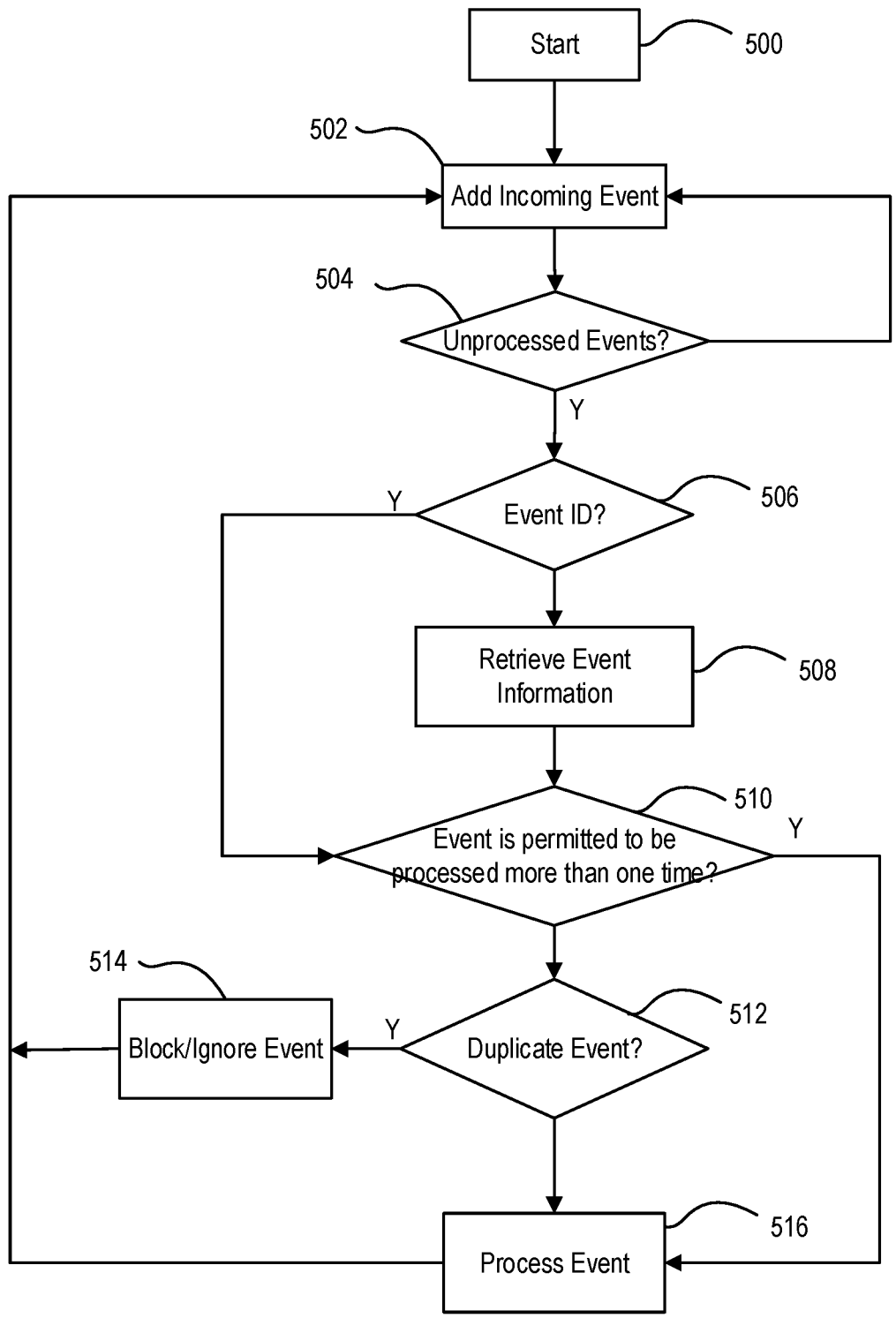
FIG. 5 depicts an example method of processing events according to one or more aspects of the disclosure.
Figure 6:
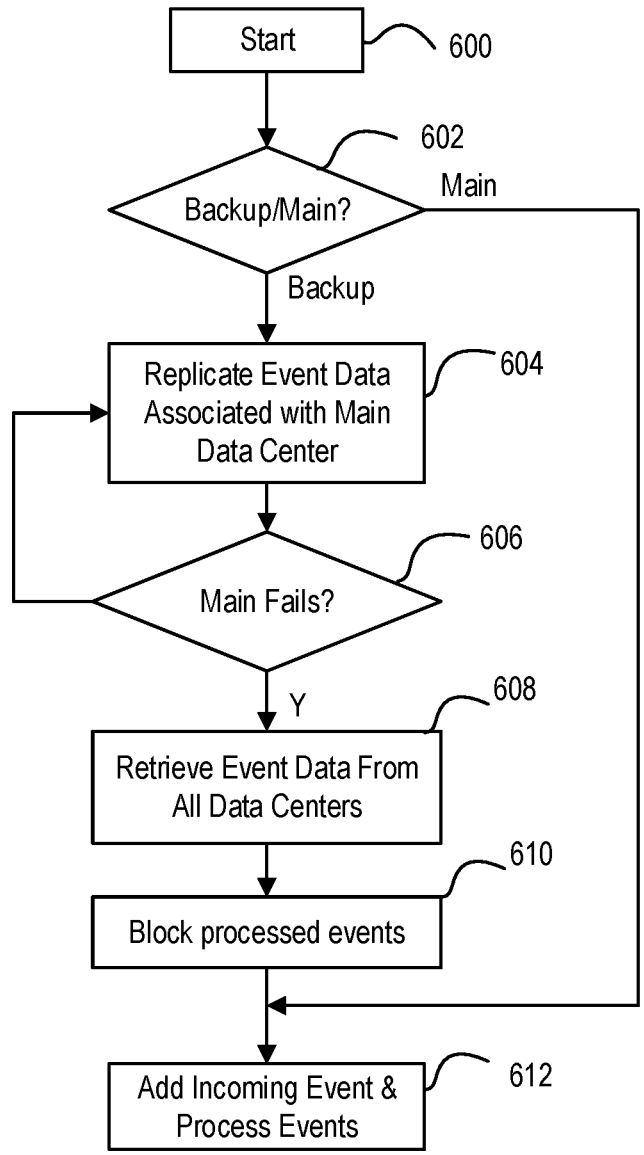
FIG. 6 depicts another example method of processing events according to one or more aspects of the disclosure.

Similar to the event processing system 300, the event processing system 400 may be associated with any other additional components, such as a central controller (not shown), which may be used in the event processing. For example, the central controller may determine, for each of the data centers 410-430, one or more potential backup data centers. For example, at initialization of the event processing system 400, the central controller may determine that while the data center 420 and the data center 430 operate as main data centers for the corresponding regions 2 and 3, the data center 420 and the data center 430 are potential backup data centers for the data center 410. Multiple data centers may work together and process the events in an active-active mode by offering the exactly once processing as well as removing any duplicate events from upstream systems (e.g., from the event sources, the brokers, etc.). Having discussed the example event processing systems, discussion will now turn to illustrative methods for processing events. FIGS. 5 and 6 depict example methods of event processing according to one or more aspects of the disclosure. Methods in FIG. 5 or 6 may be implemented by a suitable computing system, as described further herein. For example, methods in FIG. 5 or 6 may be implemented by any suitable computing environment by a computing device and/or combination of computing devices, such as computing devices 101, 105, 107, and 109 of FIG. 1. Methods in FIG. 5 or 6 may be implemented in suitable program instructions, such as in the event processing system software 127.

FIG. 5 is an example event processing method and may be performed by an event processing system such as the event processing system 200. In this example, the duplicate events, which are not permitted to be processed more than once (e.g., payment related events such as pay-bill events, or any events that negatively impact business and/or deteriorate a user's experience if processed more than once), may be processed exactly once; and the events, which are permitted to be processed more than once, may be processed without a determination whether the events are duplicate events. As such, the user's experience may be improved and the event processing resources may be efficiently utilized. The process may begin at step 500 where components in the event processing system may communicate with each other and get ready to process events from the event sources.

At step 502, as discussed previously, the event processing system may add a new event (e.g., an incoming event), received from an event source, to an event queue in a particular order (e.g., a time order), or to a corresponding consumer partition based on the destination address. Additionally, one or more databases associated with the event processing system may be updated. As previously discussed, the databases may store event identifiers, event information, consumer partitions and/or offset information, event information of processed events, event identifiers of processed events, reference event information indicating whether an event is permitted to be processed more than once, and/or any other data associated with the events. As previously discussed, the event data may be used to determine how to handle incoming events. For example, as discussed previously, the event identifier of an event in the event queue may be compared to the event identifiers of processed events, and determine that the event is a duplicate event if a match is determined.

At step 504, the event processing system may determine if there is any event in the event queue or consumer partitions. For example, if the event queue or consumer partitions do not store any event or only store dummy data, the event processing system may determine that there is no event to be processed. If there is no event to be processed, the process may return to step 502 and await an incoming event. If the event queue or consumer partitions have one or more events to be processed, the process may proceed to step 506 to analyze an event.

At step 506, the event processing system may retrieve event data from one or more databases, and may determine whether the event is assigned with an event identifier. If the event is assigned with an event identifier, the process may proceed to step 510 (which will be discussed below) to determine whether the event is permitted to be processed more than once. If the event is not assigned with an event identifier, the process may proceed to step 508. At step 508, the event processing system may retrieve the event information (e.g., the event title, the destination address, etc.) associated with the event from one or more databases. The process may proceed to step 510.

At step 510, one or more of the event identifier or the event information may be used to determine whether the event is permitted to be processed more than once. For example, as discussed previously, the event identifier may include information (e.g., a digit, a letter, a symbol, etc.) indicating whether the event is permitted to be processed more than once, and such information may be used to determine whether the event is permitted to be processed more than once. As another example, as discussed previously, the event title, included in the event information, may be compared to pre-stored event titles that are permitted to be processed more than once. If a match is determined, it is determined that the event is permitted to be processed more than once. Otherwise, it is determined that the event is not permitted to be processed more than one time.

If it is determined that the event is permitted to be processed more than once, the process may proceed to step 516. At step 516, the event may be processed and may be sent to the target consumer. The process may then return to step 502 to continue to add an incoming event in the event queue or consumer partitions.

If it is determined that the event is not permitted to be processed more than once, the process may proceed to step 512. At step 512, the event processing system may further determine whether the event is a duplicate event. As discussed previously, the determination may be based on one or more of the event identifier or the event information. For example, as discussed previously, the event identifier of the event may be compared to event identifiers of processed events stored in one or more databases, and may determine the event is a duplicate event if a match is determined. As another example, as discussed previously, the event processing system may make the determination based on event information by using the machine learning method.

If, at step 512, it is determined that the event is a duplicate event, the process may proceed to step 514. At step 514, as previously discussed, the event processing system may block or ignore one or more of the detected duplicate events. The process may then return to step 502 and continue to add an incoming event. If, at step 512, it is determined that the event is not a duplicate event, the process may proceed to step 516 where the event is processed.

In FIG. 5, steps may vary. For example, step 510 may be omitted. In some cases, in order to further save the event processing resources, an event processing system may allow one event to be processed only once even if the event is permitted to be processed more than once. For example, the event processing system may determine that resources should not be allocated to sending duplicate promotional advertisements, and more resources should be allocated to processing unprocessed events such that unprocessed events may be delivered to consumers more promptly. In these cases, step 510 may be omitted, and the event processing system may prevent all the duplicate events from being processed.

FIG. 6 is another example event processing method and may be performed by an event processing system such as the event processing systems 200, 300 or 400. In this example, if a main data center fails, a backup data center may take over the event processing and may only process events that have not been processed by the main data center. As such, the failover may take place seamlessly.

The process may begin at step 600. At step 600, components in the event processing system may communicate with each other and get ready to process events. For example, as discussed previously, a central controller may determine, for each of data centers in the event processing system, whether the data center is a main data center or a potential backup data center for the main data center.

If a data center is determined to be a potential backup data center for another data center at step 602, the process may proceed to step 604. At step 604, the potential backup data center may replicate event data associated with the corresponding main data center. Also, as discussed previously, the event tracking system (e.g., the event tracking system 332) may keep monitoring the processed events at the main data center. In the example of the event processing system 300, the backup data center 322 may be determined to be the potential backup data center for the main data center data center 312 (step 602), and may replicate event data associated with the main data center 312 (step 604). Also, the event tracking system 332 may keep monitoring the processed events at the main data center, and may record the consumer partitions or offset information of the processed events at the main data center 312, and store the consumer partitions or offset information of the processed events in one or more databases.

If a data center is determined to be the main data center (e.g., the main data center 312) at step 602, the process may proceed to step 612 (which will be described below).

At step 606, the event processing system may monitor whether the main data center fails. If the main data center does not fail, the process may return to step 604 where the backup data center may continue to replicate the event data associated with the main data center.

If a main data center fails, a failover may occur. For example, if the main data center 312 fails, the backup data center 322 may take over the event processing from the main data center 312. The process may proceed to step 608. At step 608, the backup data center may retrieve, from all data centers, event data to obtain information of events that have been processed. For example, as previously discussed, the backup data center may retrieve, from one or more databases associated with the backup data center, event data associated with the main data center. The event data may comprise event identifiers, event information, consumer partitions and/or offset information, and/or any other data associated with the events. Based on the retrieved event data, the backup data center may recreate the event processing environment that was at the main data center.

At step 610, the event tracking system may retrieve the consumer partitions or offset information of the processed events and inform the backup data center (e.g., the backup data center 322) that events identified by the retrieved consumer partitions or offset information have been processed by the main data center (e.g., main data center 312) and are duplicate events. Based on the consumer partitions or offset information of the processed events, the backup data center 322 may prevent these duplicate events from being processed. As previously discussed, the downstream system #1 326 may update the consumer partitions by replacing the processed events with dummy data or removing the processed event by releasing the resources for the processed event for future use. The downstream system #1 326 may send the updated consumer partitions to the downstream system #2 328 such that the new, unprocessed event may be sent down to the consumers 334. As such, the backup data center 322 may omit to process the events that have been processed by the main data center 312.

The backup data center (e.g., the backup data center 322) may take place of the main data center (e.g., the main data center 312). The process may proceed to step 612 where the backup data center may perform steps similar to steps 502-516. As discussed previously, incoming events may be added into the consumer partitions, and the events in the consumer partitions may be analyzed. If it is determined that events are duplicate events, the events may be blocked and need not be processed. Alternatively or additionally, if it is determined that the events are duplicate events and are not permitted to be processed more than once, the events may be blocked and need not to processed. Alternatively or additionally, if it is determined that the events are permitted to be processed more than once, the events may be processed and sent to the consumers regardless of whether the events are duplicate events.

In FIG. 6, steps may vary. For example, if a potential backup data center (similar to the data centers 410-430) is also a main data center, in parallel to steps 604-612, the potential backup data center may process events for consumers in its own service region. For example, the data center 420 is a main data center servicing region 2, and is also a potential backup data center for the data center 410 servicing region 1. In steps 604-612, the data center 420 may replicate event data of the data center 410 and take over event processing for region 1 from the data center 410. In parallel to steps 604-612, the data center 420 may also process events for region 2.

In some examples, events (e.g., payment notification alerts) may be sent to multiple customers. During this process, the payment notification alerts may be transmitted within a single data center, between multiple date centers disposed in a single geographical region, or between multiple data centers disposed in multiple geographical regions, respectively. The payment notification alerts may be processed by application(s) running on the data center(s). The data center(s) that handle the payment notification alerts may work together and send the payment notification alerts to the customers. Systems and processes described above may help process each of the payment notification alerts exactly once without any data loss. In some cases, one or more of the data centers may include one or more customer facing applications to show the payment notification alerts that have been processed. As discussed above, each of the data centers may store the event data that indicates the processed events. The data centers that include one or more customer facing applications may retrieve event data from all the data centers, and show, based on the retrieved event data and in real time, the payment notification alerts that have been sent to target customers.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
based on a first data center being one of a plurality of backup data centers for a second data center, replicating, by one or more computing devices of the first data center, first event data received by the second data center for processing, resulting in replicated event data of the second data center being stored in one or more databases accessible to the first data center, wherein the first data center is configured to process events received from one or more first event sources and the second data center is configured to process events received from one or more second event sources;
after replicating the first event data and based on a determination that the second data center has failed, performing, by the one or more computing devices of the first data center, a failover that causes the second data center to take over processing events received from the one or more first event sources and prevent duplicate event processing by:
receiving, by the one or more computing devices of the first data center and from at least one other data center of the plurality of backup data centers, second event data received by the second data center for processing,
based on the replicated event data and the second event data, configuring, by the one or more computing devices of the first data center, the first data center to recreate an event processing environment of the second data center,
based on the event processing environment, determining, by the one or more computing devices of the first data center, that at least one event of the second event data was processed by the second data center before the second data center failed, and
based on the determining that the at least one event was processed by the second data center before the second data center failed, preventing, by the one or more computing devices of the first data center, the at least one event from being processed by the first data center; and
after the failover, processing, by the one or more computing devices of the first data center, first additional event data received from the one or more first event sources and second additional event data received from the one or more second event sources.

2. The method of claim 1, wherein the replicated event data is stored in consumer partitions based on offset information; and
wherein the determining that the at least one event of the second event data was processed by the second data center before the second data center failed is performed based on the offset information.

3. The method of claim 2, wherein preventing the at least one event from being processed by the first data center comprises:
updating the consumer partitions by removing the at least one event, resulting in updated consumer partitions, and
sending the updated consumer partitions to a downstream system.

4. The method of claim 1, wherein the replicated event data comprises one or more of the following: an event title for each event of the replicated event data, a time when each event of the replicated event data was generated, an amount associated with each event of the replicated event data, or a user name associated with each event of the replicated event data.

5. The method of claim 1, wherein determining that the at least one event was processed by the second data center before the second data center failed is based on a machine learning process that trained an event tracking system to identify duplicate events.

6. The method of claim 1, wherein determining that the at least one event was processed by the second data center before the second data center failed is based on at least one event identifier of the at least one event.

7. The method of claim 1, wherein before the failover:
the first data center is configured to process events for a first geographic region,
the one or more first event sources are associated with the first geographic region,
the second data center is configured to process events for a second geographic region, and
the one or more second event sources are associated with the second geographic region.

8. The method of claim 7, wherein after the failover, the first data center is configured to process events for the first geographic region and the second geographic region.

9. The method of claim 1, wherein the at least one event is a withdrawal of money from a bank account.

10. The method of claim 1, wherein the at least one event indicates a payment associated with a bank account,
wherein the first additional event data indicates an additional payment associated with the bank account, and
wherein the method further comprises:
based on processing the first additional event data, sending, to an application associated with a user, a notification of the additional payment.

11. One or more non-transitory computer-readable media storing executable instructions that, when executed, cause one or more computing devices of a first data center to:
based on the first data center being one of a plurality of backup data centers for a second data center, replicate first event data received by the second data center for processing, resulting in replicated event data being stored in one or more databases accessible to the first data center, wherein the first data center is configured to process events received from one or more first event sources and the second data center is configured to process events received from one or more second event sources;
after replicating the first event data and based on a determination that the second data center has failed, perform a failover that causes the second data center to take over processing events received from the one or more first event sources and prevent duplicate event processing by:

receiving, from at least one other data center of the plurality of backup data centers, second event data received by the second data center for processing, based on the replicated event data and the second event data, configuring the first data center to recreate an event processing environment of the second data center, based on the event processing environment, determining that at least one event of the second event data was processed by the second data center before the second data center failed, and based on the determining that the at least one event was processed by the second data center before the second data center failed, preventing the at least one event from being processed by the first data center; and after the failover, process first additional event data received from the one or more first event sources and second additional event data received from the one or more second event sources.

12. The one or more non-transitory computer-readable media of claim 11, wherein the replicated event data is stored in consumer partitions based on offset information;

wherein the determining that the at least one event of the second event data was processed by the second data center before the second data center failed is performed based on the offset information; and wherein preventing the at least one event from being processed by the first data center comprises:
updating the consumer partitions by removing the at least one event, resulting in updated consumer partitions, and
sending the updated consumer partitions to a downstream system.

13. The one or more non-transitory computer-readable media of claim 11, wherein before the failover:
the first data center is configured to process events for a first geographic region,
the one or more first event sources are associated with the first geographic region,
the second data center is configured to process events for a second geographic region, and
the one or more second event sources are associated with the second geographic region.

14. The one or more non-transitory computer-readable media of claim 13, wherein after the failover, the first data center is configured to process events for the first geographic region and the second geographic region.

15. The one or more non-transitory computer-readable media of claim 11, wherein the at least one event is a withdrawal of money from a bank account.

16. The one or more non-transitory computer-readable media of claim 11, wherein the at least one event indicates a payment associated with a bank account,
wherein the first additional event data indicates an additional payment associated with the bank account, and
wherein the executable instructions, when executed, cause the one or more computing devices to:
based on processing the first additional event data, send, to an application associated with a user, a notification of the additional payment.

17. A system comprising:
a first data center configured to process events received from one or more first event sources; and
a second data center configured to process events received from one or more second event sources and comprising one or more computing devices;

wherein the one or more computing devices comprise:
one or more processors; and
memory storing executable instructions that, when executed by the one or more processors, cause the one or more computing devices to:
based on the first data center being one of a plurality of backup data centers for the second data center, replicate first event data sent to the second data center for processing, resulting in replicated event data of the second data center being stored in one or more databases accessible to the first data center;

after replicating the event data and based on a determination that the second data center has failed, perform a failover that causes the second data center to take over processing events received from the one or more first event sources and prevent duplicate event processing by:

receiving, from at least one other data center of the plurality of backup data centers, second event data received by the second data center for processing, based on the replicated event data and the second event data, configuring the first data center to recreate an event processing environment of the second data center, based on the event processing environment, determining that at least one event of the second event data was processed by the second data center before the second data center failed, and based on the determining that the at least one event was processed by the second data center before the second data center failed, preventing the at least one event from being processed by the first data center; and after the failover, processing first additional event data received from the one or more first event sources and second additional event data received from the one or more second event sources.

18. The system of claim 17, wherein before the failover:
the first data center is configured to process events for a first geographic region,
the one or more first event sources are associated with the first geographic region,
the second data center is configured to process events for a second geographic region, and
the one or more second event sources are associated with the second geographic region.

19. The system of claim 18, wherein after the failover, the first data center is configured to process events for the first geographic region and the second geographic region.

20. The system of claim 17, wherein the replicated event data is stored in consumer partitions based on offset information;
wherein the determining that the at least one event of the second event data was processed by the second data center before the second data center failed is performed based on the offset information; and
wherein preventing the at least one event from being processed by the first data center comprises:
updating the consumer partitions by removing the at least one event, resulting in updated consumer partitions, and
sending the updated consumer partitions to a downstream system.

* * * * *